US012325966B2

(12) United States Patent
Johansson

(10) Patent No.: US 12,325,966 B2
(45) Date of Patent: Jun. 10, 2025

(54) INTERFERENCE NOISE-CONTROL UNIT

(71) Applicant: Wavebreaker AB, Lerum (SE)

(72) Inventor: Tony Johansson, Lerum (SE)

(73) Assignee: WAVEBREAKER AB, Lerum (SE)

( * ) Notice: Subject to any disclaimer, the term of this patent is extended or adjusted under 35 U.S.C. 154(b) by 411 days.

(21) Appl. No.: 17/299,874

(22) PCT Filed: Dec. 3, 2019

(86) PCT No.: PCT/EP2019/083399
§ 371 (c)(1),
(2) Date: Jun. 4, 2021

(87) PCT Pub. No.: WO2020/115004
PCT Pub. Date: Jun. 11, 2020

(65) Prior Publication Data

US 2022/0081855 A1 Mar. 17, 2022

(30) Foreign Application Priority Data

Dec. 6, 2018 (EP) .................................... 18210719

(51) Int. Cl.
*E01F 8/00* (2006.01)
*G10K 11/162* (2006.01)
(Continued)

(52) U.S. Cl.
CPC .......... *E01F 8/0094* (2013.01); *E01F 8/0052* (2013.01); *G10K 11/162* (2013.01); *G10K 11/175* (2013.01)

(58) Field of Classification Search
CPC .... G10K 11/16; G10K 11/172; G10K 11/175; G10K 11/162; E01F 8/00; E01F 8/0005; E01F 8/0094; E01F 8/0052
See application file for complete search history.

(56) References Cited

U.S. PATENT DOCUMENTS

| | | | | |
|---|---|---|---|---|
| 1,969,704 A * | 8/1934 | Alton | H04R 1/2857 | 381/349 |
| 2,297,046 A * | 9/1942 | Bourne | F01N 1/02 | 110/184 |

(Continued)

FOREIGN PATENT DOCUMENTS

| | | |
|---|---|---|
| CN | 1455836 | 11/2003 |
| CN | 101220581 A | 7/2008 |

(Continued)

OTHER PUBLICATIONS

International Search Report and Written Opinion mailed Mar. 2, 2020; International Patent Application No. PCT/EP2019/083399 filed Dec. 3, 2019; ISA/EP.

(Continued)

*Primary Examiner* — Edgardo San Martin
(74) *Attorney, Agent, or Firm* — McDonald Hopkins LLC

(57) ABSTRACT

The disclosure relates to an interference noise-control unit comprising a housing to be secured on a sound arresting wall. The housing comprises a hollow compartment comprising at least one first channel and at least one second channel, wherein the first channel has a first channel height A and a first channel length B, and wherein the second channel has a second channel height A' and a second channel length B', and wherein the first channel height A is different from the second channel height A'.

13 Claims, 6 Drawing Sheets

(51) Int. Cl.
*G10K 11/172* (2006.01)
*G10K 11/175* (2006.01)

(56) References Cited

U.S. PATENT DOCUMENTS

| | | | | | |
|---|---|---|---|---|---|
| 2,880,817 | A * | 4/1959 | Burns | H04R 1/2811 381/349 |
| 4,069,768 | A * | 1/1978 | Matsumoto | G10K 11/175 104/124 |
| 4,158,401 | A * | 6/1979 | Matsumoto | E01B 2/003 181/292 |
| 4,339,018 | A * | 7/1982 | Warnaka | G10K 11/172 181/292 |
| 4,436,179 | A | 3/1984 | Yamamoto et al. | |
| 5,524,058 | A | 6/1996 | Moseley | |
| 5,959,265 | A * | 9/1999 | Van Ligten | G10K 11/172 181/293 |
| 6,116,375 | A * | 9/2000 | Lorch | G10K 11/172 181/224 |
| 6,435,303 | B1 * | 8/2002 | Warnaka | E04B 1/86 181/286 |
| 6,450,289 | B1 * | 9/2002 | Field | G10K 11/172 181/295 |
| 7,077,093 | B2 * | 7/2006 | Koelmel | F02B 27/021 123/184.57 |
| 7,380,636 | B2 * | 6/2008 | Yano | B64F 1/26 181/210 |
| 7,613,307 | B2 * | 11/2009 | Ohnishi | G10K 11/17861 381/71.1 |
| 8,348,012 | B2 * | 1/2013 | Hwang | F02M 35/1266 123/184.55 |
| 8,708,272 | B1 * | 4/2014 | Jones | B64C 23/005 244/1 N |
| 9,514,734 | B1 * | 12/2016 | Jones | G10K 11/161 |
| 10,621,966 | B2 * | 4/2020 | Kim | G10K 11/172 |
| 11,073,145 | B2 * | 7/2021 | Wang | F04B 39/0055 |
| 11,562,727 | B2 * | 1/2023 | Sandiford | B64D 33/02 |
| 11,682,378 | B2 * | 6/2023 | McLaughlin | G10K 11/22 181/176 |
| 2005/0161280 | A1 * | 7/2005 | Furuya | F01N 1/023 181/224 |
| 2019/0249580 | A1 * | 8/2019 | Nguyen Hung | F01N 1/168 |
| 2022/0081855 | A1 | 3/2022 | Johansson | |

FOREIGN PATENT DOCUMENTS

| | | | | | |
|---|---|---|---|---|---|
| CN | 101877808 | | | 11/2010 | |
| CN | 202688908 | | | 1/2013 | |
| CN | 105189886 | | | 12/2015 | |
| CN | 205171396 | | | 4/2016 | |
| CN | 205276150 | | | 6/2016 | |
| CN | 106057187 | | | 10/2016 | |
| CN | 112435647 | A | * | 3/2021 | |
| DE | 3425450 | A1 | | 4/1985 | |
| DE | 19509678 | C2 | * | 8/2003 | |
| DE | 102016119475 | A1 | | 4/2018 | |
| EP | 0057497 | A1 | | 8/1982 | |
| EP | 0742545 | A2 | | 11/1996 | |
| EP | 2037043 | | | 3/2009 | |
| EP | 3891727 | A1 | | 10/2021 | |
| JP | H5-061488 | | | 3/1993 | |
| JP | H0561488 | A | * | 3/1993 | |
| JP | 2820770 | B2 | * | 11/1998 | |
| JP | H11293632 | A | * | 10/1999 | |
| JP | 2005282276 | | | 10/2005 | |
| KR | 100747744 | B1 | * | 8/2007 | |
| KR | 200436715 | Y1 | * | 9/2007 | |
| KR | 101224551 | B1 | * | 1/2013 | |
| KR | 20180055592 | | | 5/2018 | |
| RU | 2604894 | | | 12/2016 | |
| TW | 201445031 | A | | 12/2014 | |
| WO | 2005078196 | | | 1/2005 | |
| WO | WO-2006115403 | A1 | * | 11/2006 | E01F 8/0041 |
| WO | 2017/198797 | A1 | | 11/2017 | |
| WO | 2018069063 | A1 | | 4/2018 | |
| WO | 2020115004 | | | 6/2020 | |

OTHER PUBLICATIONS

Japanese Office Action dated Dec. 5, 2023; Japanese Patent Application No. 2021-532424.

Australia Examination Report for Application 2019393993, dated Feb. 2, 2024, 3 pgs., Australian Patent Office.

Canadian Examination Report dated Apr. 3, 2024; Canadian Patent Application No. 3122159; p. 3.

State Intellectual Property Office of People's Republic of China, Notification of First Office Action for Application No. 2024031401458950, report issue date Mar. 14, 2024, China.

Office Action dated Mar. 14, 2024; Chinese Patent Application No. 2019800807647. (12 pages).

Search Report of Taiwan Patent Application No. 113112492 filed Dec. 2, 2019; Search Completion dated Jan. 9, 2025. 2 pages.

* cited by examiner

INTERFERENCE NOISE-CONTROL UNIT

CROSS-REFERENCE TO RELATED APPLICATION

This application is a 35 U.S.C. § 371 national stage application of PCT Application No. PCT/EP2019/083399 filed on Dec. 3, 2019, entitled "INTERFERENCE NOISE-CONTROL UNIT," which claims priority to European Patent Application No. 18210719.3 filed on Dec. 6, 2018, each of which are incorporated herein in their entirety by reference.

TECHNICAL FIELD OF THE INVENTION

The present inventive concept relates to an interference noise-control unit to be installed on a sound arresting wall.

BACKGROUND OF THE INVENTION

Sound arresting walls are used to reduce environmental noise. In particular noise originating from trains, the frequencies of which are mainly between 500-4000 Hz, provides a growing environmental issue.

The effect of noise reduction is, for a sound arresting wall, mainly dependent on the height of the wall. For various reasons, e.g. esthetical or practical, the height of the wall may be limited. However, with the installation of an interference noise-control unit to the sound arresting wall, the effect of the noise reduction may be increased, and the height of the sound arresting wall may still be kept at a low level or lowered.

Prior art interference noise control units have a plurality of channels of different lengths. As incoming noise passes through the plurality of channels, the waves are refracted and shifted in phase. When the refracted waves then interfere with the noise coming directly from the noise source the noise level is reduced.

The dimension of the channel lengths of the interference noise-control units decides what wavelengths to be reduced. It is thus common knowledge that an interference noise-control unit with different channels lengths provides a broad interference zone, see for example EP0057497. It would however be desirable not only to broaden the interference zone but also to increase the interference effect within a desired interference zone.

The present inventive concept seeks to provide an interference noise-control unit which provides an interference reduction with higher effect of reducing the traffic noise from trains, which spectrum lies primarily within the area of 500-4000 Hz.

SUMMARY OF THE INVENTION

An object of the inventive concept is to provide an interference noise-control unit which, at least to some extent, has higher noise reducing effect than prior art solutions. This, and other objects, which will become apparent in the following, are accomplished by means of an interference noise-control unit comprising channel heights of different sizes as defined in the accompanying claims.

The present inventive concept is based on the insight that by providing an interference noise-control unit with channels having different heights the noise reducing effect can be made higher compared to prior art interference noise-control units without increasing the total size of the noise-control unit.

According to at least a first aspect of the present inventive concept, an interference noise-control unit, for installation on a sound arresting wall for reducing noise from trains is provided. The interference noise-control unit comprises:

a housing to be secured on a sound arresting wall, wherein the housing comprises a hollow compartment comprising at least one first channel and at least one second channel, wherein said first channel has a first channel height A and a first channel length B, and wherein said second channel has a second channel height A' and a second channel length B', and wherein said first channel height A is different from said second channel height A'.

The interference noise-control unit has the advantage that it provides high interference effect in the spectrum originating from trains.

It should be noted that the interference noise-control unit is not limited to reducing noise from trains. The inventive concept may be applicable for reducing noise from other noise generating means. For instance, noise from vehicles, such as cars, trucks, etc. should also be included in the scope of the inventive concept.

Compared to an interference noise-control unit where the dimensions of the channels heights are the same, the noise reducing effect can be increased by having one channel larger than the others. The reason for this is that a larger portion of the propagating sound wave may be contained within the channel of bigger height, i.e. the effect of the interference noise-control unit within the frequency area of interest may be linked to the increased volume of one channel in relation to the other.

It should be understood that at least one channel height of the first channel which is different than the channel height of a second channel could also refer to having a channel width of the first channel which is different than the channel width of a second channel. One dimension of the first channel is thereby different than the corresponding dimension of the second channel.

It should also be understood that the cross sectional area of the first channel may be different than the cross sectional area of the second channel, in order to achieve the increased effect of noise reduction.

In one example embodiment, both the channel height and the channel width of the first channel are larger than the second channel height and channel width of the second channel.

It should be understood that the effect of the interference noise-control unit according to the inventive concept is achieved in comparison to an arbitrary interference noise-control unit having essentially the same inlet height.

According to at least one example embodiment, said first channel height A is larger than said second channel height A' and wherein said first channel length B is larger than said second channel length B'.

Surprisingly, it has been found that the effect of the noise reduction is dependent on a combination of both channel length and channel height, where the channel length has an impact on the lower frequency limit of the noise reduction and the channel height has an impact on the higher frequency limit of the noise reduction. The channel length determines the fundamental frequency and its harmonics and the channel height influences when the effect of the noise reduction begins to decline. Moreover, it has surprisingly been found that an increase of channel height makes the declination of noise reduction start at lower frequencies. Moreover, the channel height increases the amplitude of the interfering sound wave such that a more effective noise reduction may be achieved by increasing the channel heights of at least one of the channels.

Hereby, there is a synergistic effect of having a channel height and channel length of the first channel bigger than the channel height and channel width of the second channel. The synergistic effect comes from that the channel height highly influences the upper limit of when the reduction effect begins to fadeout and the channel length highly influences the lower limit, i.e. the channel length decides at what frequency the reduction effect begins.

Therefore, by combining the height of the channel and the length of the channel it is possible to custom make an interference noise-control unit for a specific purpose, e.g. noise reduction of trains or cars.

According to at least one example embodiment, said interference noise-control unit further comprises a third channel having a third channel height A" which is equal to or smaller than said second channel height A' and a third channel length B" which is equal to or smaller than said second channel length B'.

Hereby, the first channel height A is larger than the second channel height A' which is larger than the third channel height A".

It should be understood that a preferred order of channel heights is A>A'>A" and a preferred order of channel lengths are B>B'>B". With these orders the effective frequency area of the interference noise-control unit may be more effective compared to an interference noise-control unit having only two channels in the order of A>A' and B>B'.

In one example embodiment, said interference noise-control unit comprises more than three channels, each channel having the same or different channel height and/or channel lengths compared to the first and/or second channel.

According to at least one example embodiment, said first channel height is between 80-100 mm, said second channel height is between 50-70 mm, and said third channel height is between 30-50 mm.

Within these intervals of the channel heights the absorbed frequency is in particular focused to reduce noise in the area of 500-4000 kHz.

According to one example embodiment, the preferred channel heights A, A' and A" are 92 mm, 62 mm and 42 mm, respectively.

According to at least one example embodiment, said first channel length B is between 0.08-1.1 m and wherein said second channel length B' is between 0.05-0.8 m.

In at least one example embodiment, a third channel comprises the channel length B" between 0.05-0.4 m.

According to at least one example embodiment, the inlet height of said interference noise-control unit is between 100-300 mm, and preferably 200 mm.

Hereby, the interference noise-control unit is able to interfere the sound coming from low as well high noise sources and still have an unobtrusive appearance.

The term inlet height of the interference noise-control unit should herein be understood as the sum of the channel heights of the interference noise-control unit.

According to at least one example embodiment, the total number of channels are 3-4.

Hereby, there is both a desired inlet height and a desired number of channels of the interference noise-control unit, which makes the channel height of each channel limited.

The removal of a baffle between two channels could increase the effect of the interference noise-control unit, as such, since a new channel having a larger channel height than the two origin channels, and possibly the other channels, are provided. However, in order to achieve the better effect of the new channel height, it should also be taken in account that the total number of channels is kept within the desired limit. Likewise, the effect of inserting an additional baffle into a channel, to provide two new channels of new channel heights, should also be related to that the total number of channels does not exceed appropriate limits.

Thus, the decision to insert or remove a baffle within the interference noise-control unit in order to differentiate a channel height compared to the others should preferably be considered with the total number of channels taken in account.

According to at least one example embodiment, said second channel is located on top of said first channel.

Hereby, the channel with the largest cross sectional area is located closest to the ground.

It should be understood that in an embodiment where the second channel is located on top of the first channel, an optional third channel may be located on top of the second channel.

Hereby, the cross sectional area of the channels decreases in size the further up in the interference noise-control unit they are located. Alternatively, the size of the cross sectional area decreases compared to the first channel, e.g. all of the channels within the interference noise-control unit have the same cross sectional area except the first channel which has a larger cross sectional area than the others.

According to at least one example embodiment, the relationship between said first channel height and said second channel height and optionally said second channel height to said third channel height, is in the interval of 1.1-3.0, and preferably 1.5.

Hereby, the channel heights may have a constant ratio to one another.

According to at least one example embodiment, said housing comprises a case and an insert, said insert comprising a plurality of baffles.

Hereby, the interference noise-control unit may be manufactured in two pieces, one case and at least one insert. An advantage of having an interference noise-control unit comprising two initially separate parts is that different inserts may be adapted to one existing shell and that the insert may be removed and replaced with another one. Hereby, the noise interference-control unit may be adapted to the existing noise spectrum. Also from a manufacturing point of view, it may be cheaper while allowing greater flexibility.

According to at least one example embodiment, said channels are essentially straight and vertically directed.

Hereby, there are no channels directed to the interior of the housing from the inlet. Instead, the channels lead the noise sound from the interior of the housing to the upper part of the interference noise-control unit.

According to at least a second aspect of the present inventive concept, a process for making an interference noise-control unit is provided. The process comprises the steps of:

extruding a case, injection moulding an insert, mounting said case on a sound arresting wall, and mounting said insert to said case.

The interference noise-control unit may have any one of the structural and/or functional features discussed in connection with the interference noise-control unit of the first aspect of the inventive concept.

The process of the second aspect of the inventive concept is advantageous in that a very long case may be extruded in one run, in contrast to if the interference noise-control unit would have been injection moulded, which would be costlier, and require very large moulding tools. After the case has been extruded, one or more injection moulded inserts (for which a relatively small moulding tool may be used) may be inserted into the case. The insert or inserts may be placed in the case before or after it has been mounted on the sound arresting wall.

BRIEF DESCRIPTION OF THE DRAWINGS

The present inventive concept will now be described in more detail, with reference to the appended drawings showing example embodiments, wherein:

FIG. 1*b* may also illustrate a cross section of the embodiment of FIG. 2*c*.

DETAILED DESCRIPTION OF THE DRAWINGS

In the following description, the present inventive concept is described with reference to an interference noise-control unit, for installation on a sound arresting wall for reducing noise from trains or cars.

Figure 1A:
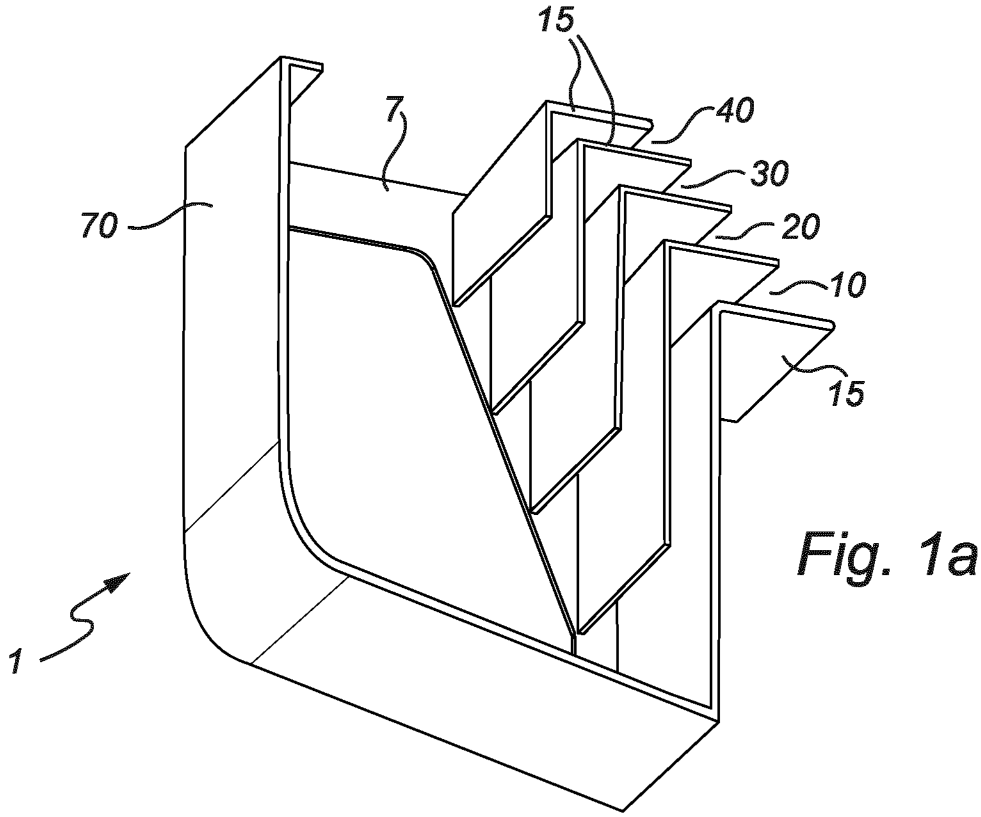
FIG. 1*a* illustrates, in a perspective view, the interior of an interference noise-control unit according to at least one example embodiment of the inventive concept.
Figure 1C:
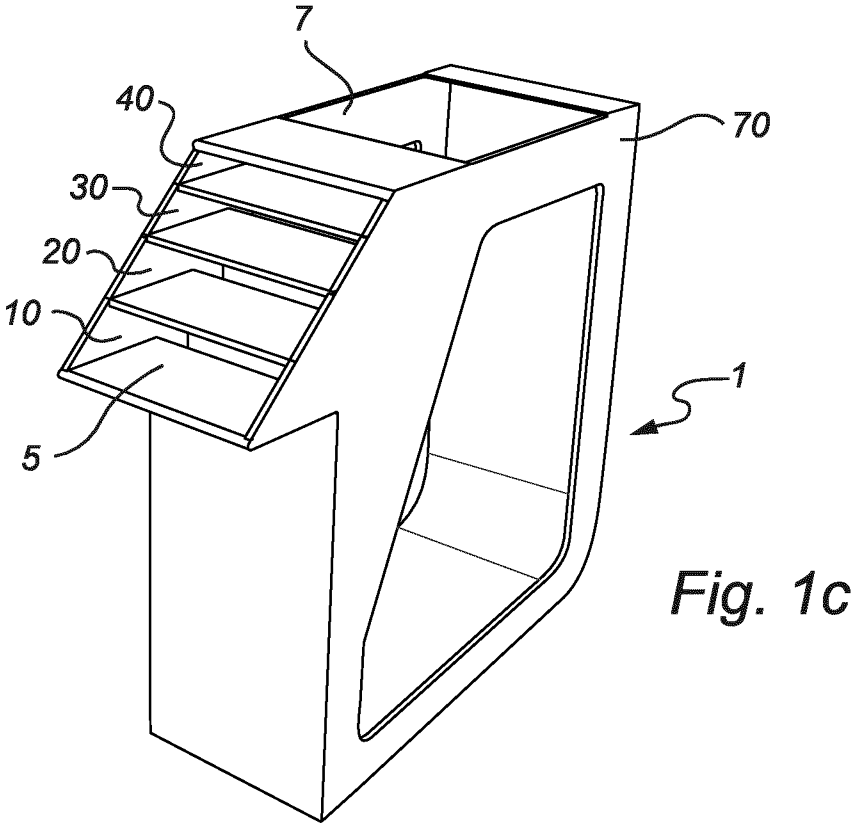
FIG. 1*c* illustrates, in a perspective view, the interference noise-control unit shown in FIGS. 1*a* and 1*b;*
Figure 1B:
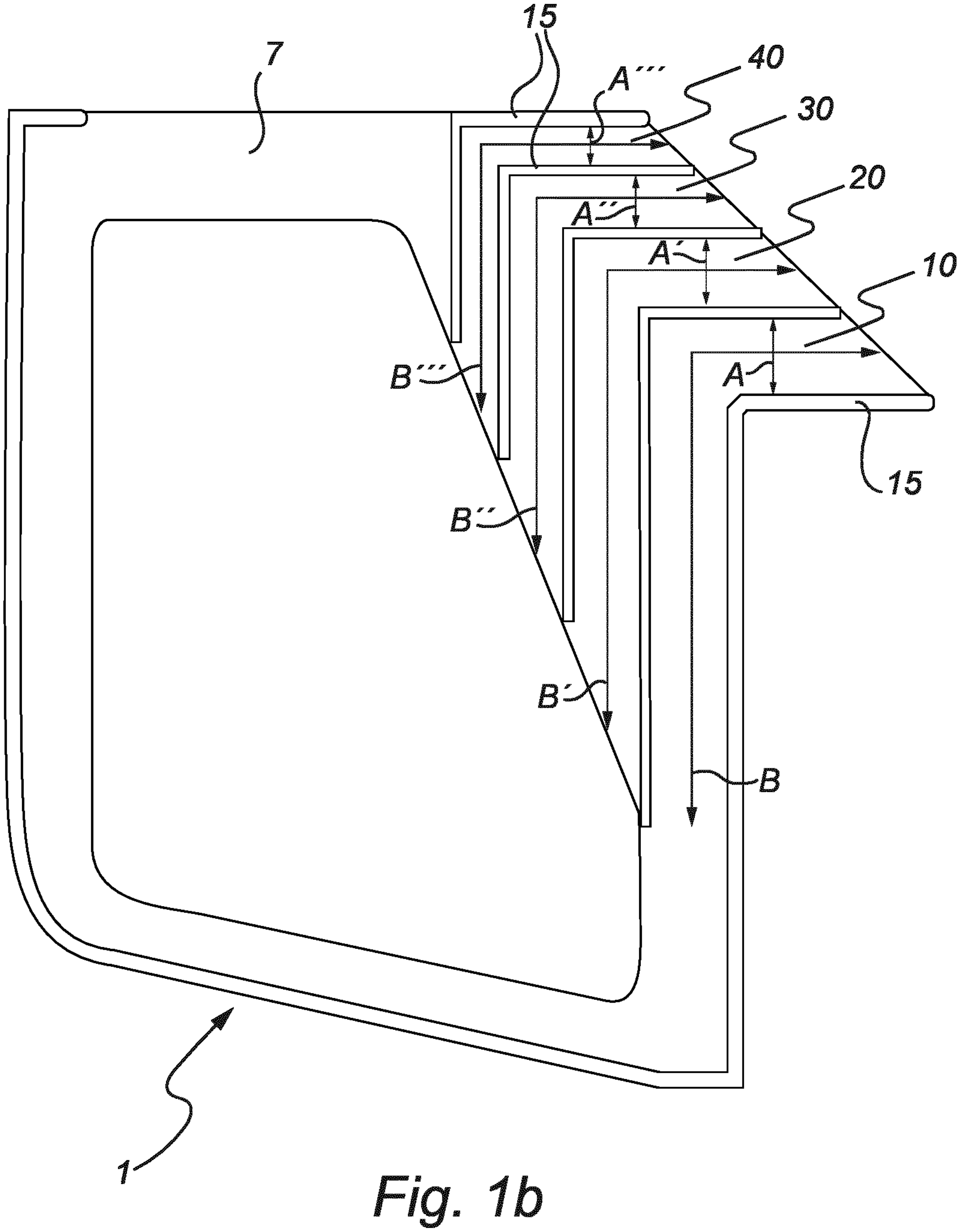
FIG. 1*b* illustrates, in a cross-sectional view, the interference noise-control unit shown in FIG. 1*a*.

FIGS. 1*a*, 1*b* and 1*c* illustrate an interference noise-control unit 1 to be installed on a sound arresting wall. The interference noise-control unit 1 comprises a first channel 10 having a first channel height A and a first channel length B, a second channel 20 having a second channel height A' and a second channel length B', a third channel 30 having a third channel height A" and a third channel length B", and a fourth channel 40 having a fourth channel height A'" and a fourth channel length B'". I.e. each one of the channels illustrated in FIGS. 1*a*, 1*b*, and 1*c* has a distinct channel height and a distinct channel length. Furthermore, the channels 10, 20, 30, 40, shown in FIGS. 1*a*, 1*b*, and 1*c*, are positioned such that the first channel 10, having the largest channel height and longest channel length, is below the others. The channels on top of the first channel 10 are arranged with decreasing channel height and channel length the further up they are positioned.

The channels 10, 20, 30, 40 are separated from each other by a plurality of angled baffles 15. In FIGS. 1*a*, 1*b*, and 1*c*, five baffles 15 of unequal lengths are positioned with different interspaces in between. The interspace between two adjacent baffles 15 defines the channel height of the respective channel. As shown in the FIGS. 1*a*, 1*b* and 1*c*, each channel height is constant throughout the whole channel.

When noise reaches the interference noise-control unit 1 sound waves enter the channels 10, 20, 30, 40. In the channels, the sound waves are shifted in phase such that the frequencies of the emerging sound waves are shifted in phase compared to the frequencies of the sound waves having not passed the interference noise-control unit 1. When the emerging sound waves then meet the sound which has not passed the interference noise-control unit 1 interference appears and a sound volume reducing zone is provided.

Since each one of the channels 10, 20, 30, 40, shown in FIGS. 1*a*, 1*b* and 1*c*, has a distinct channel length the interval of the interference spectrum is enlarged.

Figure 2A:
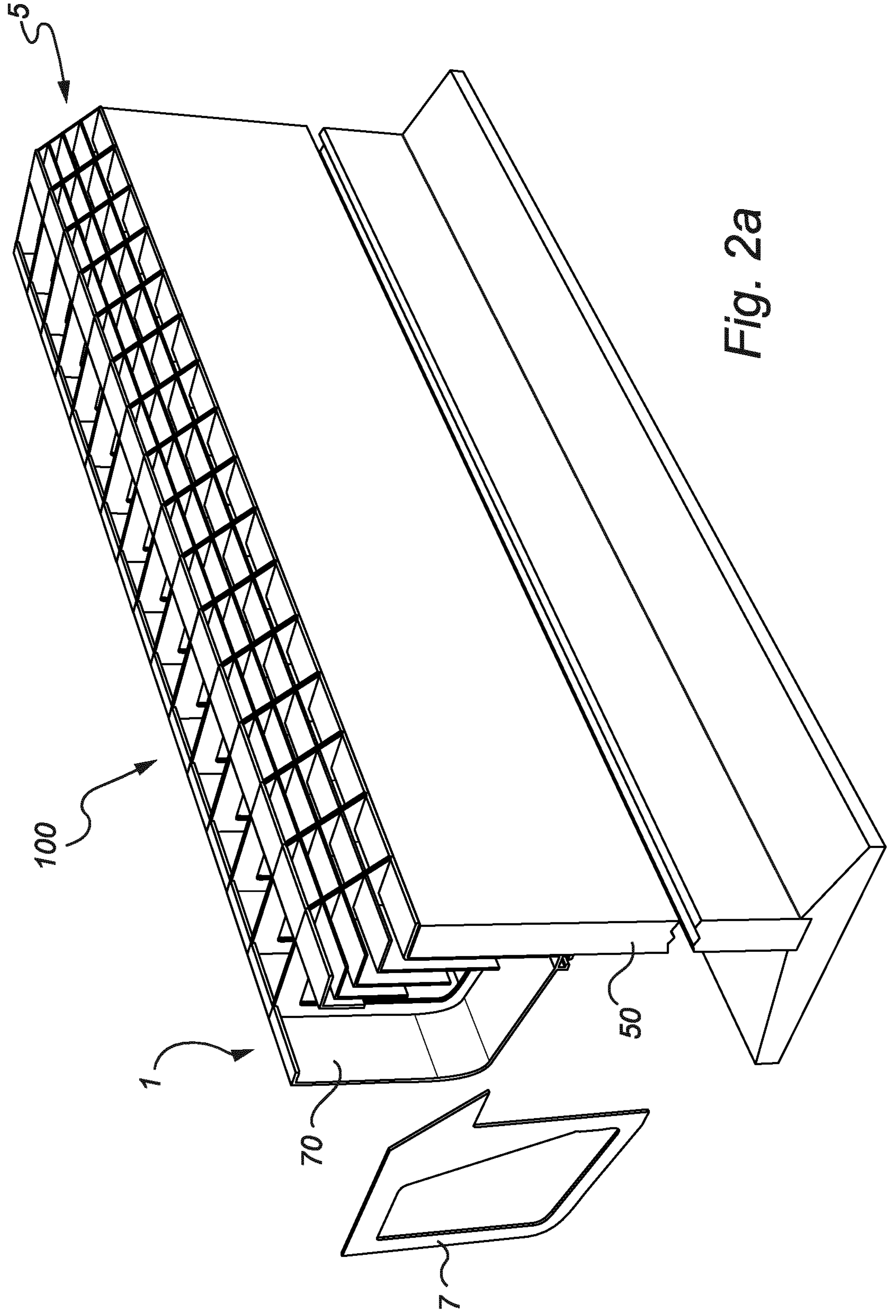
FIGS. 2*a* and 2*b* illustrate, in a perspective view, an assembly of a plurality of parallel interference noise-control units shown in FIG. 1*a*-1*c*, when installed on a sound arresting wall.
Figure 2B:
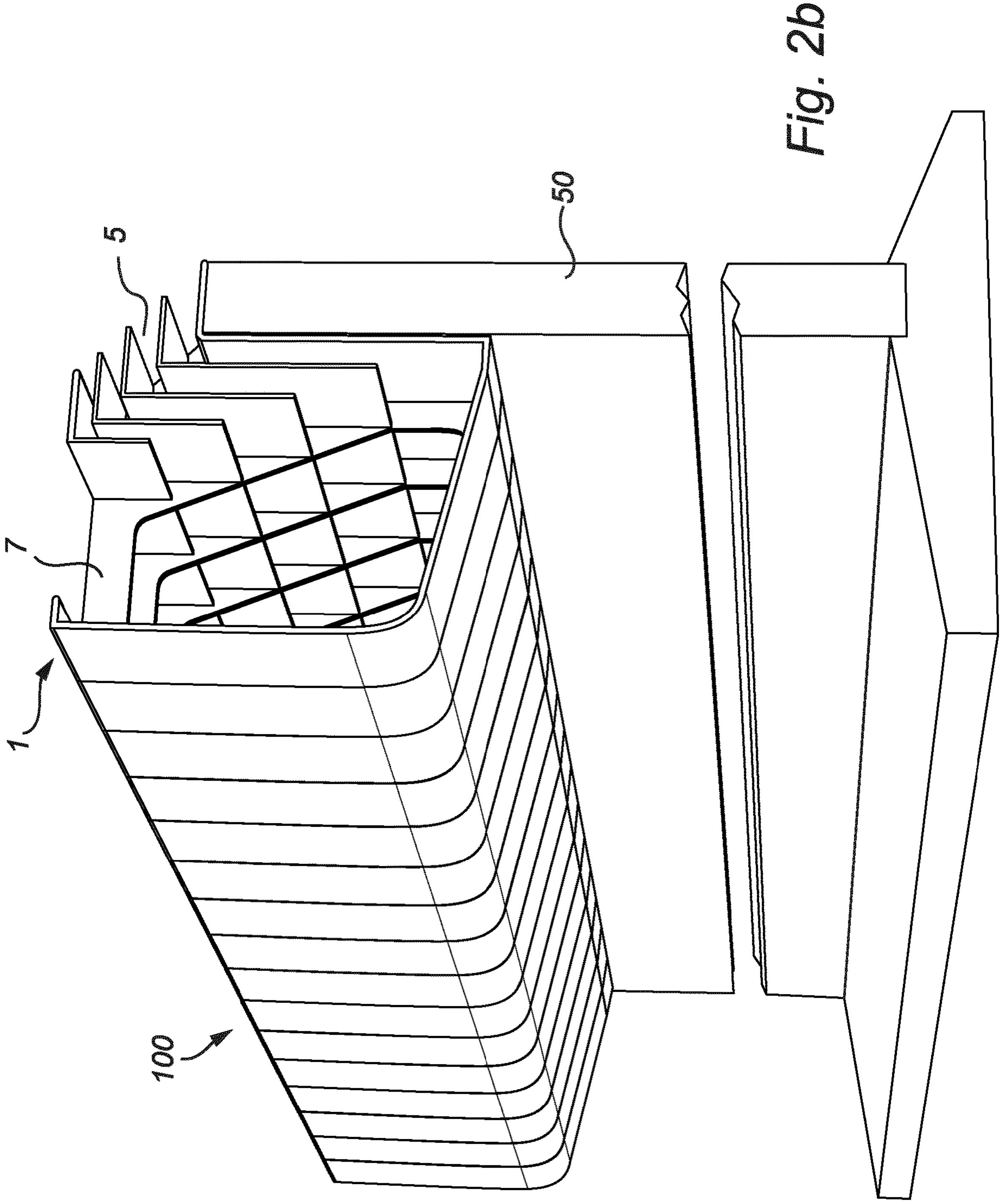

FIGS. 2*a* and 2*b* illustrate an assembly 100 of a plurality of parallel interference noise-control units 1 installed on a sound arresting wall 50. The interference noise-control units 1 are installed with the inlet 5 of the interference noise-control unit facing the noise source (not shown in the figures). The inlet 5 of the interference noise-control unit 1, also shown in FIG. 1*c*, is positioned on top of the sound arresting wall 50. Channels 10, 20, 30, 40, encompassed within a housing 70, extend to the back of the sound arresting wall 50. I.e. the inlet 5 of the interference noise-control unit 1 rests on the sound arresting wall 50 while the housing 70 is positioned behind the sound arresting wall 50. Alternatively, the interference noise-control unit may be positioned on the side of the sound arresting wall, preferably on the side facing the noise source. Hereby, both the inlet and the housing is positioned in front of the sound arresting wall, seen from the position of the noise source. This position is advantageous in that the interference noise-control unit is less visible from the outside of the sound arresting wall. For clarity is a side wall 7 of the housing 70 removed in FIGS. 2*a* and 2*b*. The upper portion of the interference noise-control unit 1 is open such that the incoming sound waves are allowed to exit on top of the interference noise-control unit 1. Hence, the out coming waves meet the noise on top of the interference noise-control unit 1 and the sound volume reducing zone is provided around the interference noise-control unit 1 and the sound arresting wall 50.

FIGS. 2*a* and 2*b* are shown in a perspective view to envisage that the interference noise-control unit 1 may be installed on an existing sound arresting wall 50 and that the existing sound arresting wall 50 may be shaped in different heights or lengths.

Figure 2C:
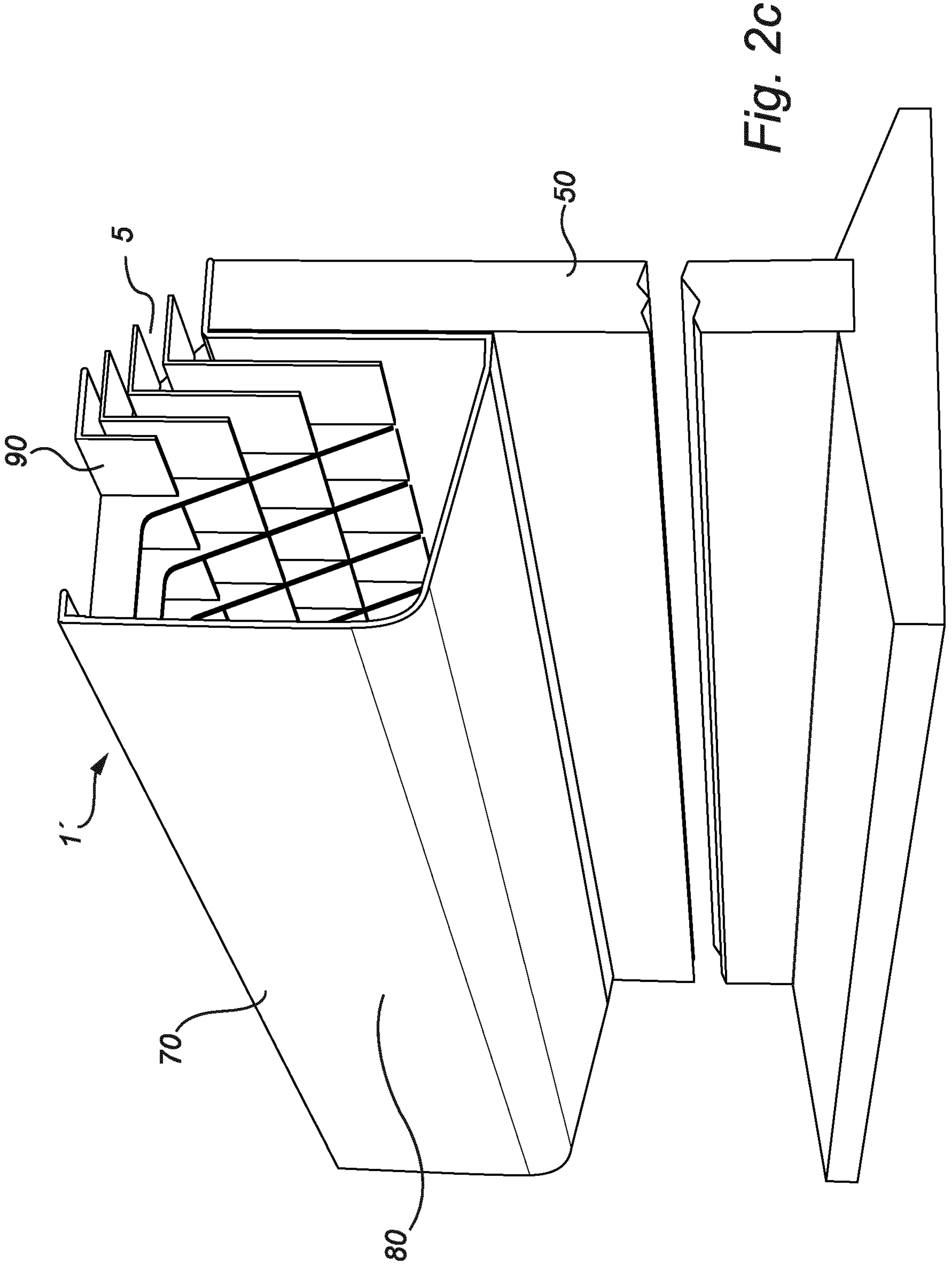
FIG. 2*c* illustrates, in a perspective view, an interference noise-control unit according to at least one example embodiment of the inventive concept.

FIG. 2*c* illustrates an interference noise-control unit 1' made up of a shell or case 80 and a plurality of inserts 90. The case 80 and the inserts 90 together form a housing 70 which is mounted on a sound arresting wall 50. The case 80 is manufactured in one piece and the insert 90 is manufactured in a second piece which is mounted on the case 80. Hereby, the insert 90 may be exchanged while the case 80 is still mounted on the sound arresting wall 50.

Figure 3:
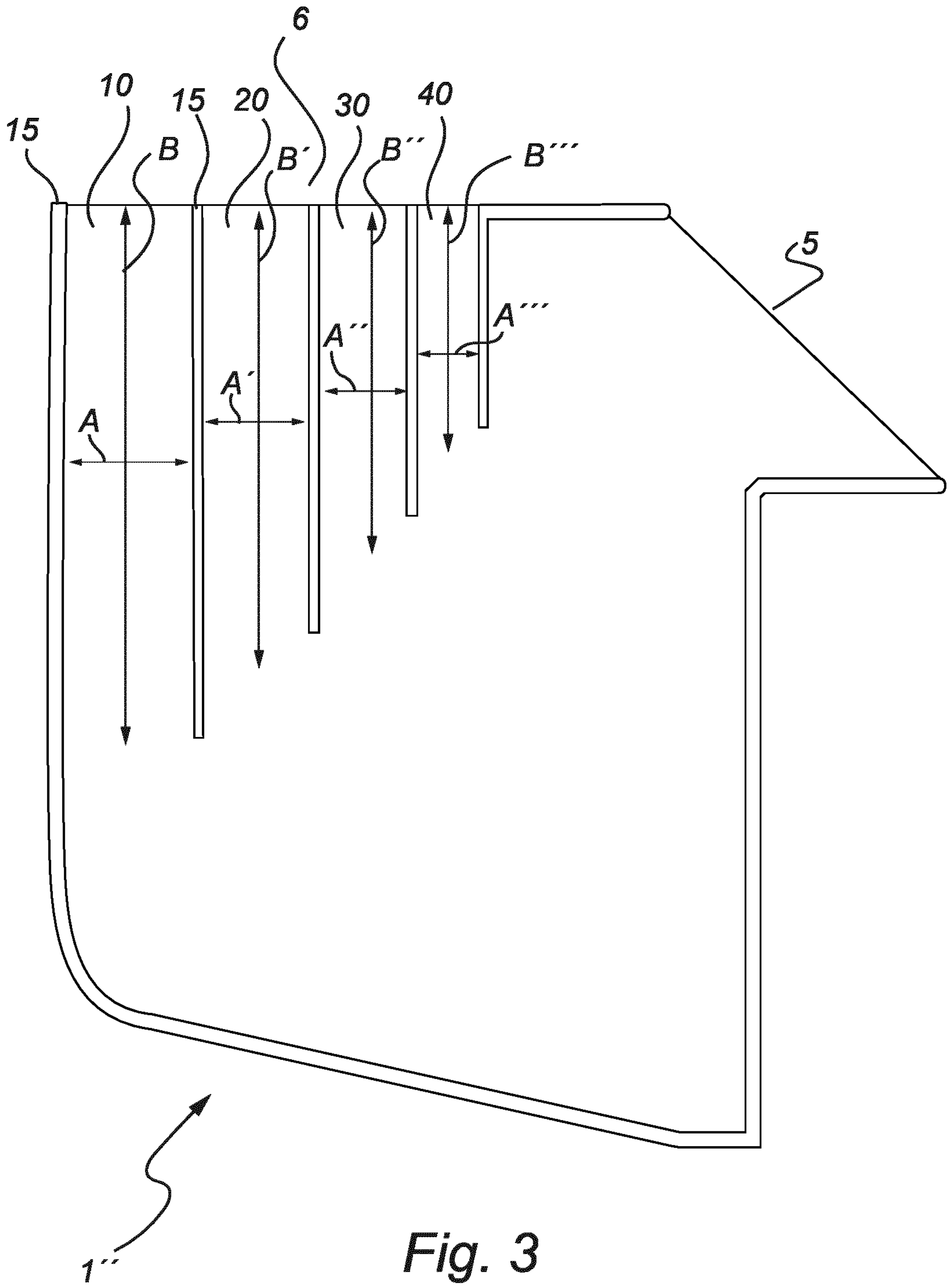
FIG. 3 illustrates, in a cross-sectional view, an interference noise-control unit according to at least one example embodiment of the inventive concept.

FIG. 3 illustrates an interference noise-control unit 1" which has an inlet without any channels. The channels 10, 20, 30, 40 are connected to the outlet 6 of the interference noise-control unit 1", i.e. the baffles 15 are located vertically and essentially straight. Since there is no horizontal path of the channels 10, 20, 30, 40, in FIG. 3, the channel width is thus understood to be interpret as the channel height. Each one of the channels 10, 20, 30, 40 has a distinct channel width/height A, A', A", A'" and a distinct channel length B, B', B" B'".

The invention claimed is:

1. An interference noise-control unit, for installation on a sound arresting wall for reducing noise from trains, comprising:

a housing to be secured on a sound arresting wall, wherein the housing comprises a hollow compartment comprising at least one first channel and at least one second channel, wherein said first channel has a first channel height A and a first channel length B, wherein said second channel has a second channel height A' and a second channel length B', wherein said first channel height A is different from said second channel height A' and wherein said housing comprises a case and an insert, said insert comprising a plurality of baffles forming said first and second channels.

2. An interference noise-control unit according to claim 1, wherein said first channel height A is larger than said second channel height A' and wherein said first channel length B is larger than said second channel length B'.

3. An interference noise-control unit according to claim 1, further comprising a third channel having a third channel height A" which is equal to or smaller than said second channel height A' and a third channel length B" which is equal to or smaller than said second channel length B'.

4. An interference noise-control unit according to claim 3, wherein said first channel height A is between 80-100 mm, said second channel height A' is between 50-70 mm, and said third channel height A" is between 30-50 mm.

5. An interference noise-control unit according to claim 1, wherein said first channel length B is between 0.08-1.1 m and wherein said second channel length B' is between 0.05-0.8 m.

6. An interference noise-control unit according to claim 1, wherein an inlet height of said interference noise-control unit is between 100-300 mm.

7. An interference noise-control unit according to claim 1, wherein a total number of channels are 3-4.

8. An interference noise-control unit according to claim 1, wherein said second channel is located on top of said first channel.

9. An interference noise-control unit according to claim 3, wherein a relationship between said first channel height A and said second channel height A' is in an interval of 1.1-3.0.

10. An interference noise-control unit according to claim 1, wherein said channels are bent and having one essentially vertical length portion with an opening facing a noise source and one essentially horizontal length portion.

11. An interference noise-control unit according to claim 1, wherein said channels are essentially straight and vertically directed.

12. A process for making an interference noise-control unit, comprising the steps of:

forming a case, injection moulding an insert wherein said case and said insert form a housing, mounting said case on a sound arresting wall, and mounting said insert to said case, wherein the housing comprises a hollow compartment comprising at least one first channel and at least one second channel, wherein said first channel has a first channel height A and a first channel length B, and wherein said second channel has a second channel height A' and a second channel length B', and wherein said first channel height A is different from said second channel height A', a third channel having a third channel height A" which is equal to or smaller than said second channel height A' and a third channel length B" which is equal to or smaller than said second channel length B wherein a relationship between a second channel height A' to a third channel height A", is in an interval of 1.1-3.0 and wherein said insert comprises a plurality of baffles forming said first, second and third channels.

13. An interference noise-control unit, for installation on a sound arresting wall for reducing noise from trains, comprising:

a housing to be secured on a sound arresting wall, wherein the housing comprises a hollow compartment comprising at least one first channel and at least one second channel, wherein said first channel has a first channel height A and a first channel length B, and wherein said second channel has a second channel height A' and a second channel length B', and wherein said first channel height A is different from said second channel height A', wherein a relationship between said first channel height A and said second channel height A' is in an interval of 1.1-3.0, and wherein said housing comprises a case and an insert, said insert comprising a plurality of baffles forming said channels.

* * * * *